United States Patent [19]
Skaggs

[11] Patent Number: 5,746,551
[45] Date of Patent: May 5, 1998

[54] HOLE PREPARATION APPARATUS AND METHOD OF USE

[75] Inventor: John M. Skaggs, Rockwall, Tex.

[73] Assignee: E-Systems, Inc., Dallas, Tex.

[21] Appl. No.: 674,142

[22] Filed: Jul. 1, 1996

[51] Int. Cl.[6] .......................... B23B 35/00; B23B 49/00
[52] U.S. Cl. ........................... 408/1 R; 408/80; 408/112
[58] Field of Search .......................... 408/1 R, 72 B, 408/79, 80, 97, 110, 112, 202, 203, 226, 239 R, 241 B

[56] References Cited

U.S. PATENT DOCUMENTS

| | | |
|---|---|---|
| 36,903 | 11/1862 | Hadley . |
| 68,504 | 9/1867 | Haworth . |
| 521,206 | 6/1894 | Covel . |
| 1,023,002 | 4/1912 | Bennett . |
| 2,294,303 | 8/1942 | Jagow ........................... 408/80 |
| 2,296,087 | 9/1942 | Burns . |
| 2,335,614 | 11/1943 | Spievak . |
| 2,360,942 | 10/1944 | Ellerstein . |
| 2,365,986 | 12/1944 | Wilson . |
| 2,372,398 | 3/1945 | Shoffner . |
| 2,784,616 | 3/1957 | Quackenbush . |
| 3,083,593 | 4/1963 | Cotter ........................... 408/241 R |
| 3,540,322 | 11/1970 | Swanson ........................... 408/112 |
| 3,620,635 | 11/1971 | DalBlanco . |
| 3,907,452 | 9/1975 | Tripp . |
| 5,096,342 | 3/1992 | Blankenship et al. . |
| 5,228,811 | 7/1993 | Potter . |
| 5,318,390 | 6/1994 | DalBlanco . |

*Primary Examiner*—Daniel W. Howell
*Attorney, Agent, or Firm*—Baker & Botts, L.L.P.

[57] ABSTRACT

A hole preparation apparatus for back drilling, upsizing and reaming mating precision holes. The apparatus includes three main sections—a tubular body section, a base and a drive shaft assembly.

The drive shaft assembly includes an upper portion sized to be received in the chuck of a conventional pneumatic or electric drill, a lower portion sized to be received in the bore of the tubular body. An internal threaded drill receiving socket is disposed at a lower end of the lower portion of the drive shaft. A coil retractor spring is located in the central bore of the tubular body section. A removable pilot drill is received in the drill receiving socket. A pilot drill bushing is located in the bottom end of the bore of the tubular body. An opener drill is changeable with the pilot drill and is received in the drill receiving socket when the pilot drill is removed. An opener drill bushing, is changeable with the pilot drill bushing.

21 Claims, 6 Drawing Sheets

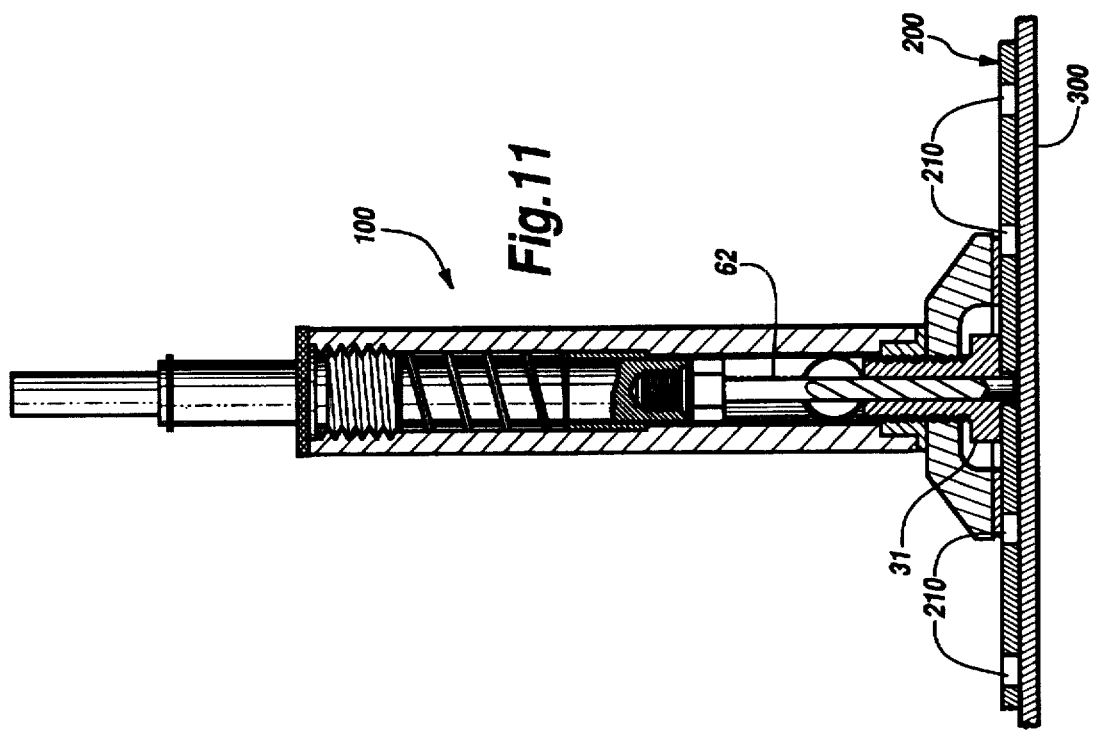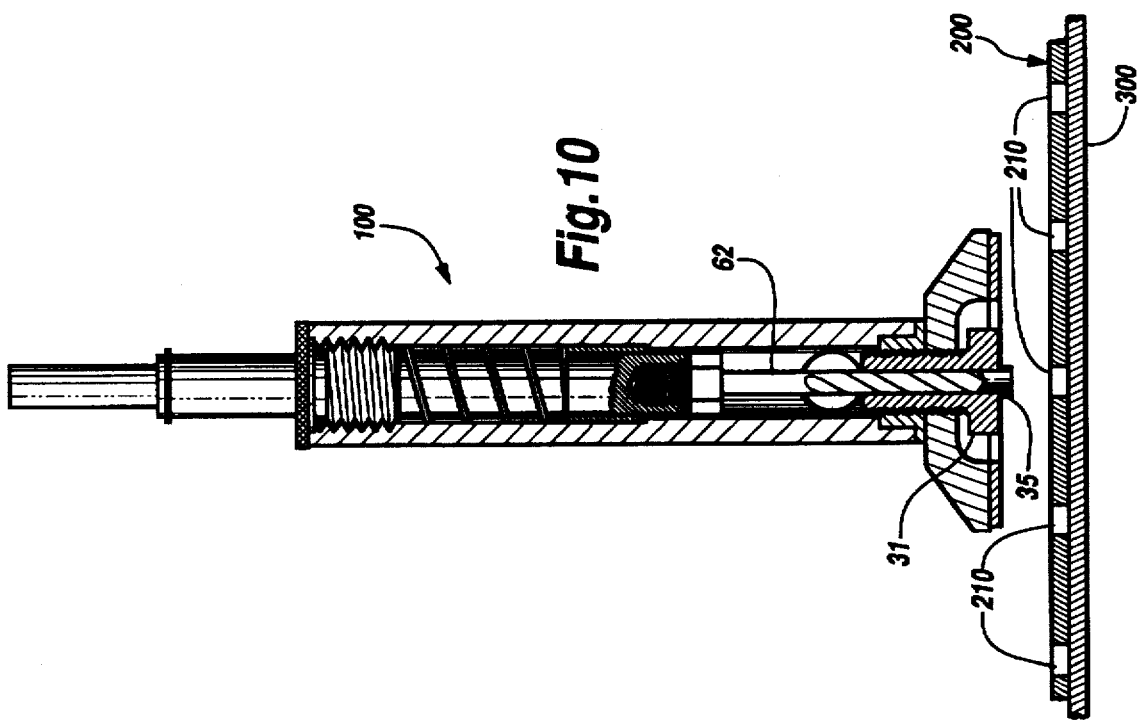

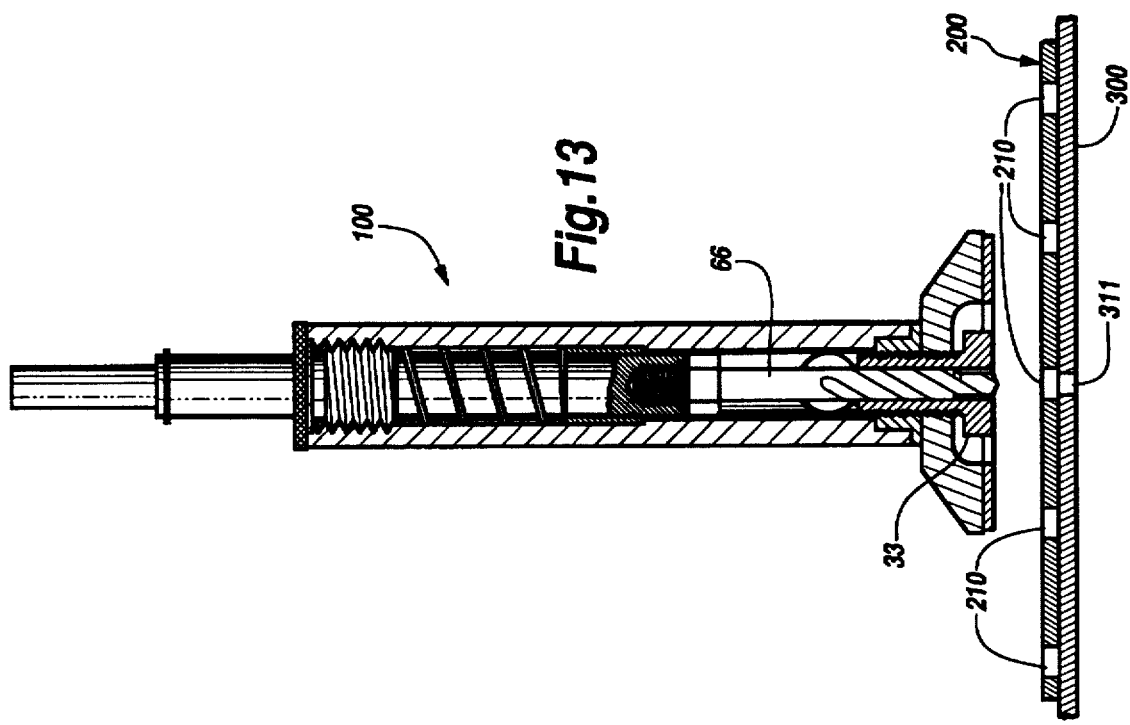
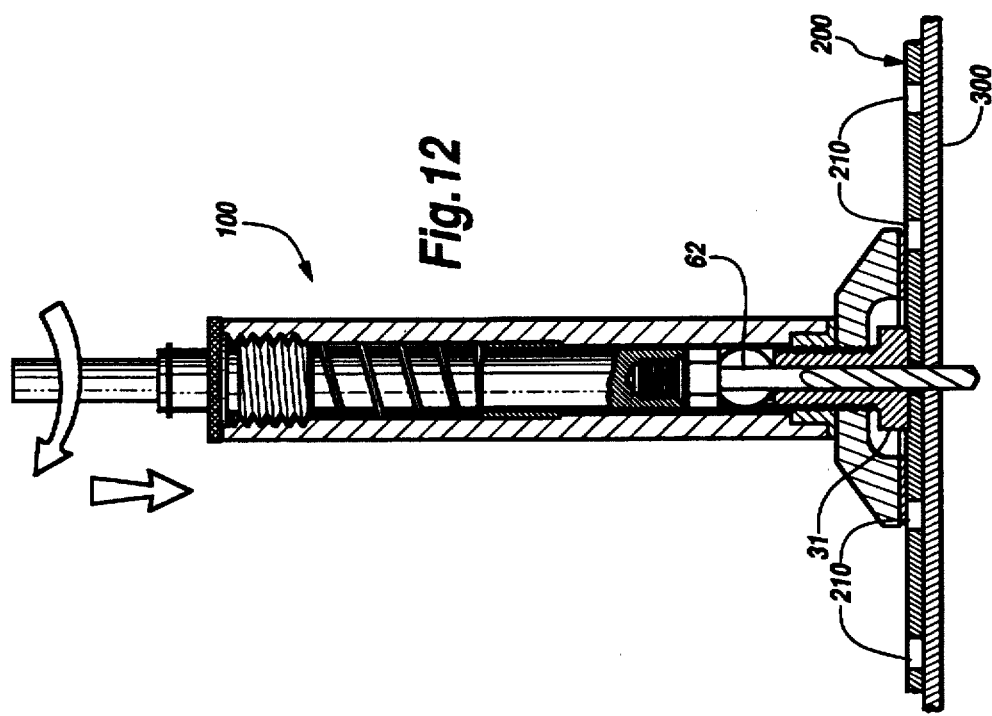

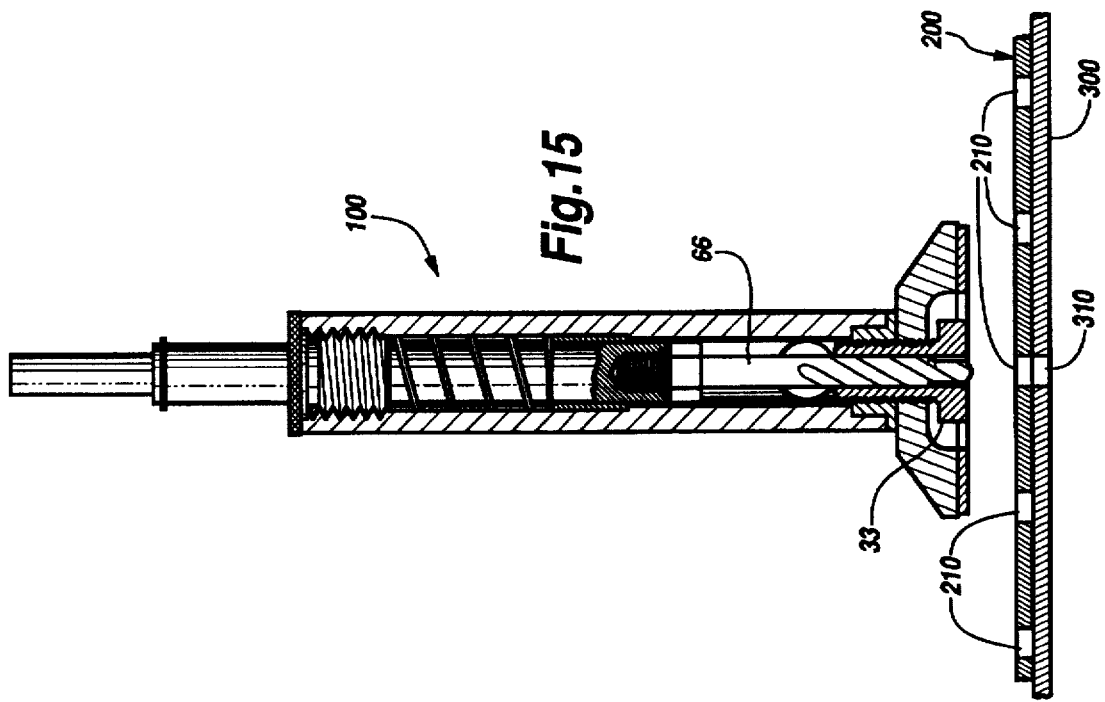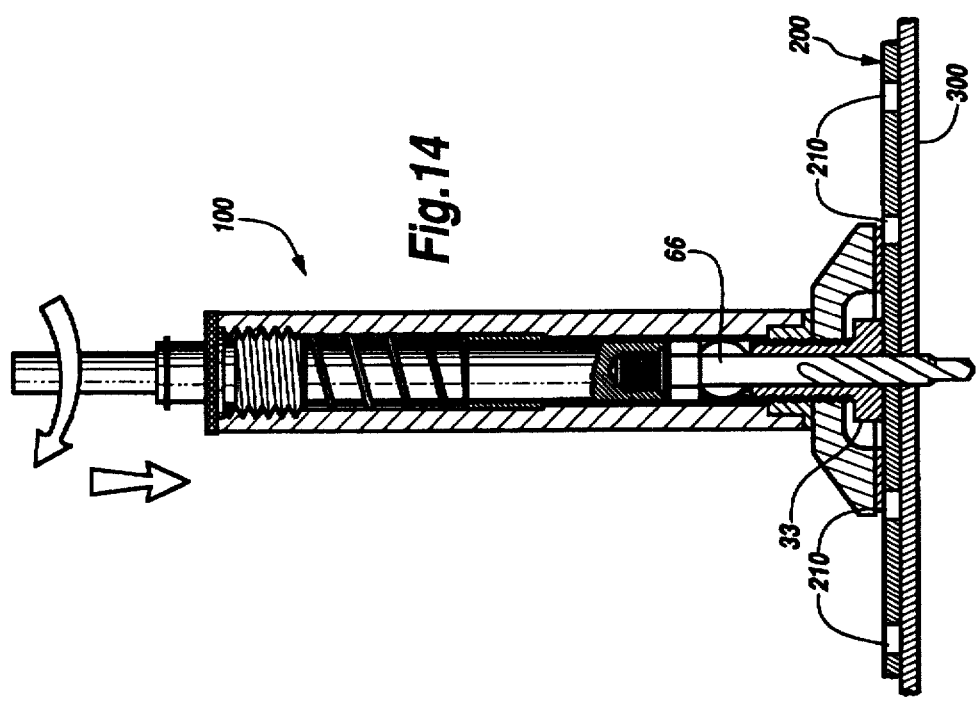

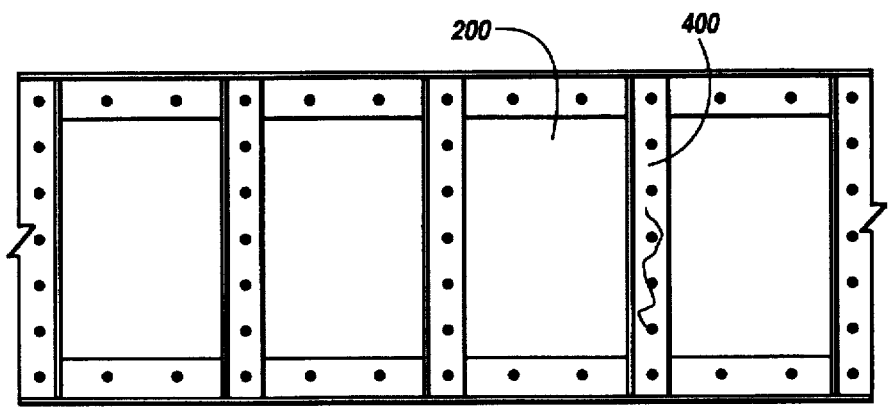
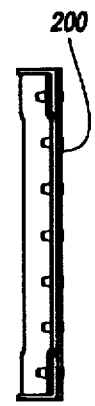
Fig.16  Fig.17
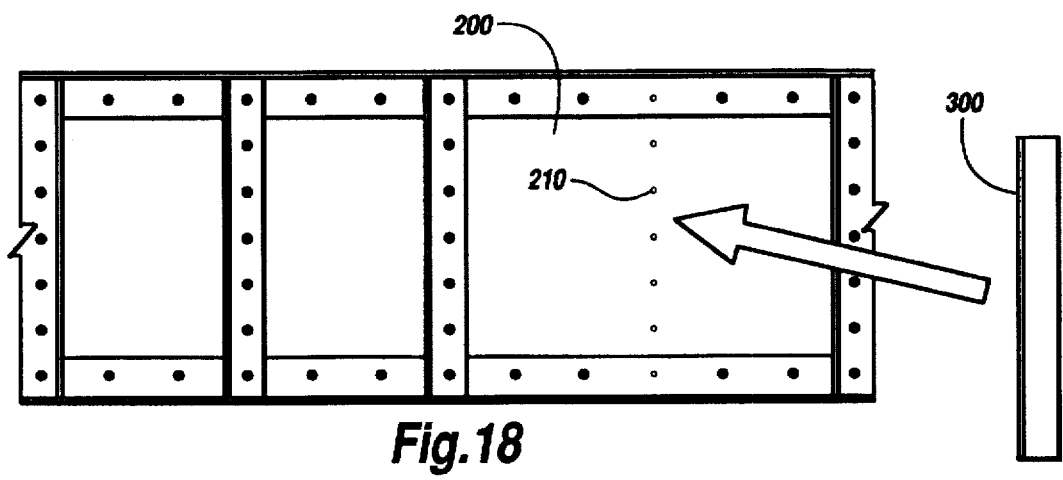
Fig.18
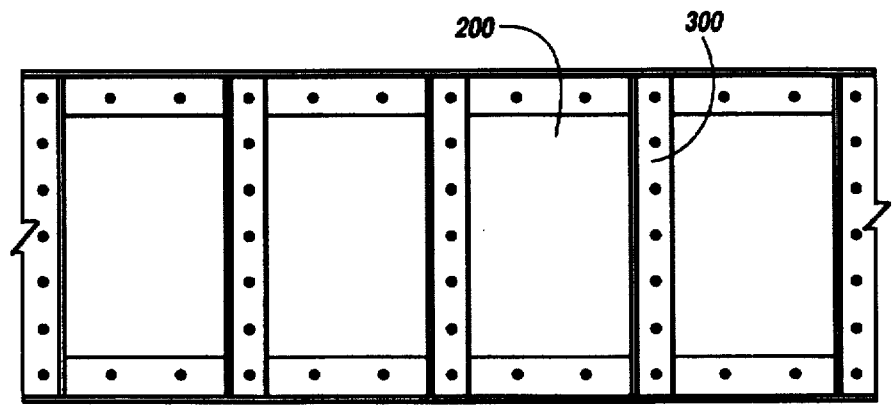
Fig.19

5,746,551

HOLE PREPARATION APPARATUS AND METHOD OF USE

TECHNICAL FIELD

This invention relates generally to an apparatus and method for aperture preparation, and more particularly to a hole preparation apparatus for back drilling, upsizing and reaming mating precision apertures.

BACKGROUND OF THE INVENTION

In many hole drilling operations performed by hand drilling machines it is accepted practice to use a drill guide at the distal end of a twist drill for the purpose of holding the cutting end of the drill in alignment with the axis of rotation of the drill. Examples include the apparatus described in U.S. Pat. Nos. 2,784,616; 2,335,614 and 3,907,452.

The present invention addresses specific problems encountered in replacing and or refastening structural parts on an airframe. Precision holes must be transferred from existing parts into replacement mating parts for subsequent mechanical fastening. Heretofore, transferring precision holes was accomplished by clamping a replacement part without the required assembly holes to the existing assembly and back drilling through the existing hole into the replacement part. Such a process ensures that the holes for fasteners are properly aligned. Traditional techniques of back drilling require a highly skilled drill operator in order to avoid elongation of the holes. If the holes are elongated, the hole must be enlarged to accept oversized fasteners. In many cases, parts must be scrapped because the edge distance after oversizing is not sufficient for the application. The present invention overcomes these limitations by adapting and improving the use of drill guides.

SUMMARY OF THE INVENTION

The present invention comprises a hole preparation apparatus for back drilling, upsizing and reaming mating precision holes. Used in conjunction with a portable drill or suitable rotating power source, the apparatus includes three main sections—a tubular body section, a base and a cylindrical drive shaft assembly.

The tubular body includes a cylindrical bore having a first predetermined diameter in an upper portion of the bore and a smaller second diameter in a lower portion of the bore. The change in diameter occurs abruptly thereby forming a ledge in the bore. The top portion of the bore is internally threaded at a top end and includes an internal cylindrical bushing landed in the ledge of the bore.

The base section includes a circular cavity opening to the bottom and an axial internally threaded bore connecting a top side of the base with the circular cavity.

The cylindrical drive shaft includes an upper portion sized to be received in the chuck of a conventional drill or alternate power source, and a lower portion sized to be received in the lower portion of the bore of the tubular body. An internal threaded drill receiving socket is disposed in the lower end of the lower portion of the drive shaft. A first retaining ring is assembled in a first groove on the drive shaft proximal to a top end. A second retaining ring is assembled in a second groove on the drive shaft located below the first groove. A drive shaft bushing is located on the drive shaft between the first and second retaining rings. A coil retractor spring is positioned in the central bore of the body section. The lower end of the coil spring is seated on the top of the internal bushing and the upper end of the coil spring is seated against the lower retaining ring of the drive shaft.

BRIEF DESCRIPTION OF THE DRAWINGS

A more complete understanding of the present invention may be had by reference to the following Detailed Description when taken in conjunction with the accompanying drawings wherein:

FIGS. 10, 11, 12, 13, 14, and 15 are a sequence of cross section views illustrating a method of use for the apparatus of the present invention;

FIG. 16 is a front view of an assembly having a faulty structural member to be replaced using the method and apparatus of the present invention;

FIG. 17 is a side view of the assembly of FIG. 16;

FIG. 18 is a front view of the assembly of FIG. 16; and

FIG. 19 is a front view of the assembly of FIG. 16 shown with the replacement part installed.

DETAILED DESCRIPTION OF THE INVENTION

Figure 1:
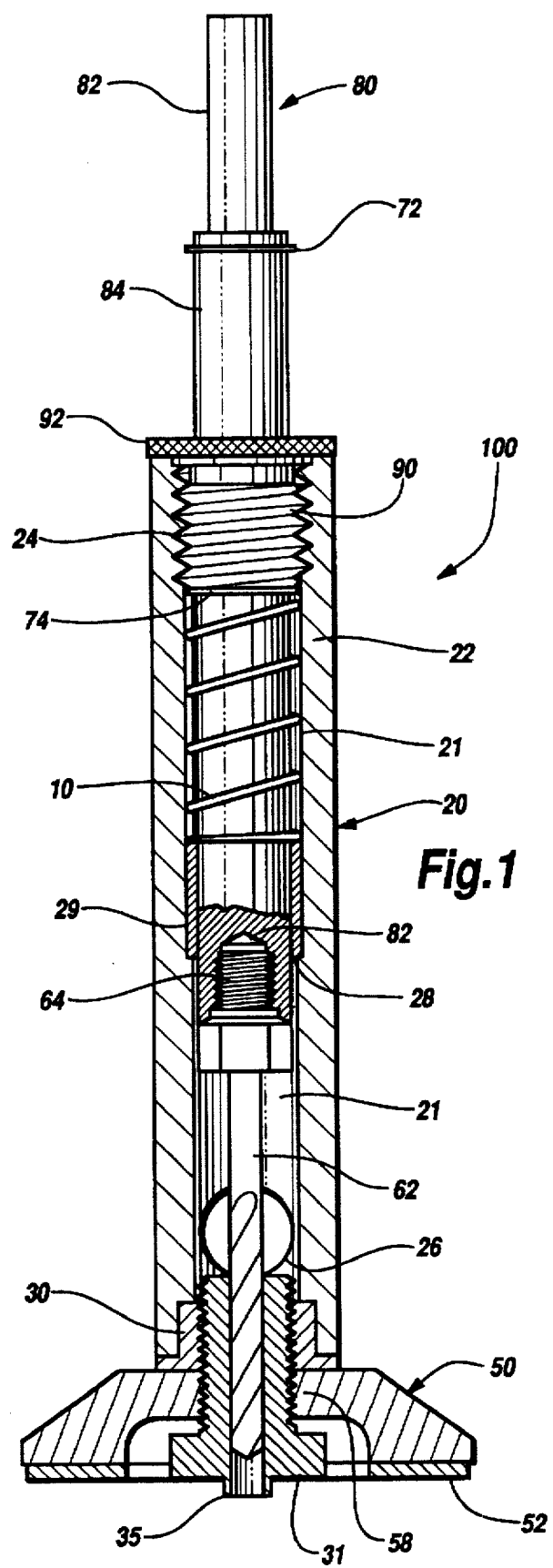
FIG. 1 is a cross section view of the hole preparation apparatus of the present invention.

Reference is now made to the Drawings wherein like reference characters denote like or similar parts throughout the 19 Figures. Referring to FIG. 1, therein is disclosed a hole preparation apparatus 100 for use in conjunction with a portable drill or suitable rotating power source (not shown). The apparatus 100 includes three main sections—a tubular body section 20, a base 50 and a drive shaft assembly 80.

Figure 2:
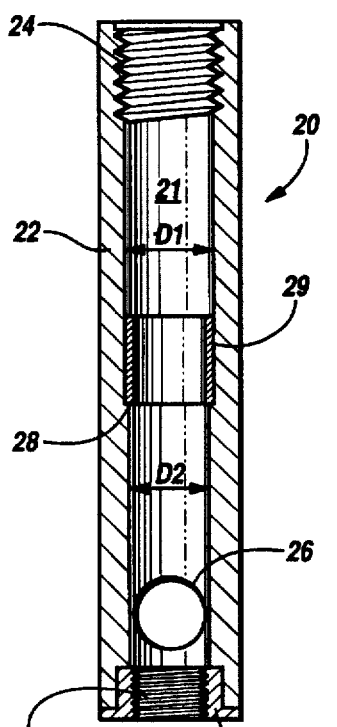
FIG. 2 is a partial cross section view of a cylindrical body section of the apparatus of FIG. 1.

Referring now to FIG. 1 and FIG. 2, the body section 20 is illustrated in more detail. The body section subassembly includes a cylindrical tube 22, preferably constructed from aluminum alloy. The top end 24 of the tube 22 is internally threaded for receiving a drive shaft bushing 90 (see FIG. 5). The lower end of the tube 22 receives a press fit bottom bushing 30. At least one opening 26 is present in the lower portion of the tube 22 to allow drill shavings to exit the tube 22. The tube 22 has an internal diameter D1 in the upper portion of the tube that is slightly greater than the internal diameter D2 of the lower portion of the tube 22. The change in diameter is abrupt, creating a ledge 28. An internal bushing 29 is press fit into the bore of the tube 22 and lands on the ledge 28. The bushing 29 has an internal bore sufficient to provide clearance for continuous rotation of the drive shaft 80 (see FIG. 5). The bore of the tube 22 should be sufficiently smooth to allow a coil spring 10 (see FIG. 1) to expand and compress without binding. The bottom bushing 30 is preferably machined from steel to prevent internal threads 38 from being stripped due to repeated interchanging of a pilot drill bushing 31 (FIG. 8) with an opener drill bushing 33 (FIG. 9).

Figure 3:
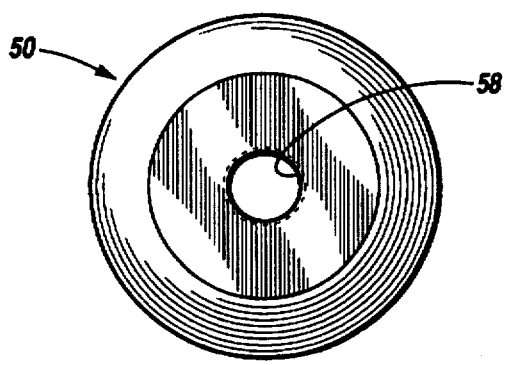
FIG. 3 is a top view of a base for the apparatus of FIG. 1.
Figure 4:
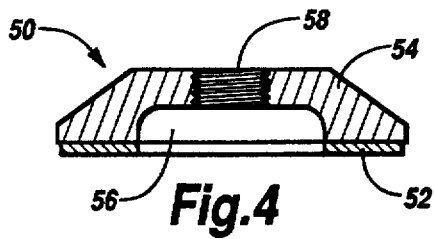
FIG. 4 is a side view of the base of the apparatus of FIG. 1.

Referring now to FIGS. 1, 3 and 4, therein is illustrated the base 50. The base 50 has a generally truncated conical shape with a circular cavity 56 opening to the bottom. An internally threaded opening 58, located at the central axis of the base 50, passes from the top of the base 50 to the bottom cavity 56. The bottom of the base 50 may include a non-slip polymeric pad 52 for contacting a work surface.

Figure 5:
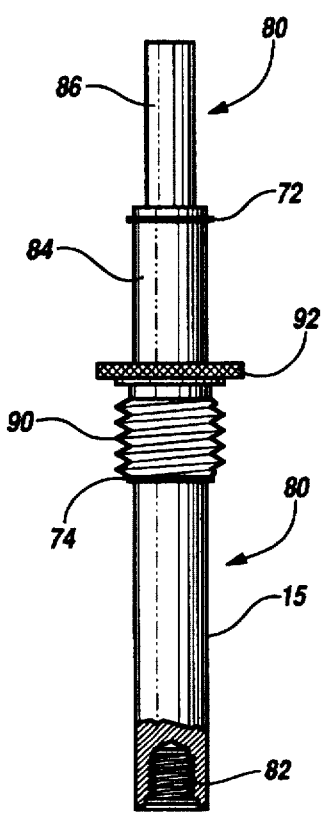
FIG. 5 is a side view of the drive shaft of the apparatus of FIG. 1.

Now referring to FIG. 1 and FIG. 5, the drive shaft assembly 80 includes an internally threaded drill receiving socket 82 on the lower end. The upper end 86 of the shaft is sized to be received in a standard drill chuck (not shown). The lower portion 84 of the drive shaft 80 is sized to be received in the bore of the tube 22. A drive shaft bushing 90 slips over the lower portion 84 of the drive shaft 80 and is held on the shaft by an upper retaining ring 72 and a lower retaining ring 74. The drive shaft bushing 90 includes an outer knurled ring 92 for advancing the bushing 90 into the internally threaded upper section 24 of the tube 22 (see FIG. 1).

Figure 6:
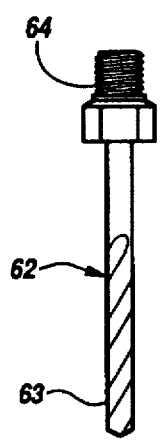
FIG. 6 is a side view of a pilot drill of the apparatus of FIG. 1.
Figure 7:
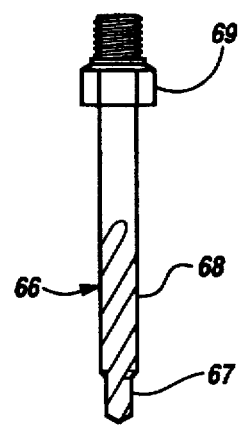
FIG. 7 is a side view of an opener drill of the apparatus of FIG. 1.

FIGS. 6 and 7 illustrate a typical pair of drills 62 and 66 of the present invention. A pilot drill 62 has a cutting portion 63 and a threaded shank portion 64. The opener drill 66 includes a pilot portion 67, comparably sized to the pilot drill 62, and a cutting portion 68 sized for opening a hole 210 in the desired part 300 (see FIGS. 10 and 17). A head portion 69 has a hex-shaped configuration to tighten the drill bit 62 in the tool. The opener drill 66 further includes a threaded shank portion 64.

Figure 8:
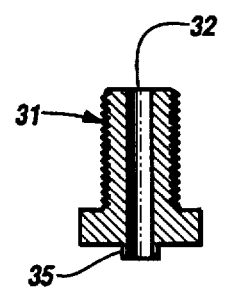
FIG. 8 is a side view of a pilot bushing of the apparatus of FIG. 1.
Figure 9:
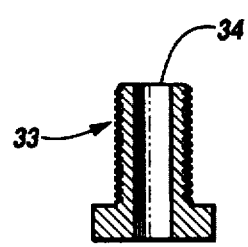
FIG. 9 is a side view of an opener bushing of the apparatus of FIG. 1.

FIG. 8 illustrates a pilot drill bushing 31, including an internal bore 32 for passing the drill 62 therethrough, and an external pilot collar 35 for locating and centering the apparatus 100 in existing holes 210 which are to be transferred to replacement part 300 (See FIGS. 11 and 18). The internal bore 32 of pilot drill bushing 31 is sized to allow ample clearance of the drill 62 while minimizing the deflection in the cutting portion 63. A separate pilot drill bushing 31 is required for each size hole 210.

Referring to FIG. 9, a separate opener bushing 33 is required for each size hole 210. The opener bushing 33 includes a smooth bore 34 for passing the opener drill 66 therethrough. The primary function of the opener bushing 33 is to minimize the deflection of the cutting apparatus while pilot holes 311 are drilled/reamed to match the size of the existing holes 210 (see FIGS. 13 to 15).

Returning now to FIG. 1, therein is illustrated the assembled apparatus 100. The pilot drill bushing 31 is threaded into the opening 58 of the base 50 and then threaded into the bottom bushing 30 of the tube 22, thereby securing the body section 20 to the base 50. The threaded shank portion 64 of the pilot drill 62 is inserted into the receiving socket 82 of the drive shaft 80 and securely tightened.

A coil spring 10 is inserted into a central bore 21 of the body section 20 and the lower end is seated on the top of the internal bushing 29. The drive shaft assembly 80, including the drill 62, is inserted into the central bore 21 of the body section 20. The drive shaft bushing 90 is inserted into an internally threaded top end 24 of the tube 22 and secured using the knurled ring 92. The upper end of the coil spring 10 is seated against the lower retaining ring 74.

In operation, a downward force applied to the drive shaft 80 moves the shaft downward in the central bore 21 of the body section 20, pushing the pilot drill 62 through the pilot drill bushing 31. The coil spring 10 is compressed between the top of the bushing 29 and the retaining ring 74. When the applied downward force is removed, the coil spring 10 retracts the drill 62 into the pilot bushing 31.

FIGS. 10–15 illustrate the method of operation of apparatus 100. As shown in FIGS. 10 and 11, apparatus 100 is positioned over a preexisting part 200 with preexisting holes 210 (FIG. 10). The pilot collar 35 of the pilot bushing 31 is inserted into the preexisting hole 210 (FIG. 11). Rotational and downward forces are applied to the drive shaft 80 and a concentric pilot hole 311 is opened in part 300 (FIG. 12). The apparatus 100 is removed from the holes 210 and 311 and the pilot bushing 31 is removed and replaced by the opener bushing 33. The drill 62 is replaced by the opener drill 66. The apparatus 100 is repositioned over the holes 210 and 311 (FIG. 13). Rotational and downward forces are applied to the drive shaft 80 and the pilot hole 311 is drilled/reamed to the desired full size by the drill/reamer 66 (FIG. 14) and the apparatus 100 is removed (FIG. 15). The mating parts 300 and 200 have the mating holes 210 and 310 of the desired size.

Referring now to FIGS. 16–19, therein is illustrated replacement of a damaged portion 400 of an aircraft (FIGS. 16 and 17). The replacement part 300 (without holes) contacts the existing part 200 containing preexisting holes 210 (FIGS. 18 and 19). The existing hole pattern is transferred to replacement part 300 using the apparatus 100 as described with regard to FIGS. 10–15.

Although the preferred embodiment of the invention have been illustrated in the accompanying Drawings and described in the foregoing Detailed Description, it will be understood that the invention is not limited to the embodiment disclosed but is capable of numerous modifications without departing from the scope of the invention as claimed.

I claim:

1. An apparatus for preparation of apertures for assembly of parts comprising:
    a body having a central bore with an internally threaded section at an upper end of the central bore, said body including a lower end;
    a base having:
        top and bottom ends; and
        an internally threaded bore extending through the base;
    a drive shaft having:
        an upper portion sized to be coupled to a conventional source of rotational power;
        a lower portion sized to pass through the central bore of said body; and
        an internally threaded drill receiving socket attached to a lower end of the lower portion of the drive shaft;
    a drive shaft bushing mounted to the drive shaft, said drive shaft bushing having a central opening for passage of the drive shaft and an external threaded section sized to engage the internally threaded section at the upper end of the central bore; and
    a drill bushing mounted to the lower end of the central bore of said body, said drill bushing having a central opening for passage of a drill bit.

2. The apparatus for preparation of apertures of claim 1 further including an external pilot collar attached to the bottom of said drill bushing, said pilot collar having a passage concentric with a longitudinal axis of the central opening of said drill bushing.

3. The apparatus for preparation of apertures of claim 1 wherein the drill bushing comprises an opener drill bushing.

4. A drill guide for drilling a hole in a structural part, said drill guide comprising:

a hollow body section;

a drive shaft projecting at least partly into the hollow body section, said drive shaft having a lower end for receiving a drill bit;

a drill bushing secured to the lower end of the body section, the drill bushing having an internal bore to allow passage of the drill bit; and said drill bushing further includes a pilot drill bushing having an external pilot collar attached to a bottom of the pilot drill bushing, the external pilot collar concentric with an internal bore of the pilot drill bushing.

5. The drill guide in accordance with claim 4 further comprising a base attached to the lower end of the hollow body section for stabilizing the hollow body section and the drive shaft, said base includes a cavity for accessing a drill housing.

6. An apparatus for preparation of apertures comprising:

a tubular body having:

a central bore with an upper end and a lower end and a lower portion and an upper portion, said bore having a first diameter in the upper portion of the bore and a second smaller diameter in the lower portion of the bore, said change in diameter forming a ledge in the bore, said bore being internally threaded at the upper end;

an internal cylindrical bushing engaging the ledge of the bore of the tubular body;

a base having:

top and bottom ends;

an internally threaded bore extending into the base from the top end;

a drive shaft having:

an upper portion sized to be coupled to a conventional source of rotational power;

a lower portion sized to pass through the lower portion of the central bore of said tubular body;

an internally threaded drill receiving socket attached to a lower end of the lower portion of the drive shaft;

a drive shaft bushing having a central opening sized to receive the drive shaft and an externally threaded section sized to engage the internally threaded bore at the upper end of the tubular body;

a retractor spring located in the central bore of the tubular body and in engagement with the ledge of said tubular body and with the drive shaft;

a pilot drill bushing fastened in the lower end of the central bore of the tubular body, said pilot drill bushing having:

a bottom;

a central opening sized to allow passage of a pilot drill;

an external pilot collar attached to the bottom of the pilot drill bushing, said pilot collar having a passage concentric with a longitudinal axis of the central opening of the pilot drill bushing; and an opener drill bushing interchangeable with the pilot drill bushing, said opener drill bushing having a central opening sized to allow passage of an opener drill.

7. A method for back drilling, upsizing and reaming a mating hole in adjacent first and second parts of an assembly comprising the steps of:

positioning a pilot bushing over a preexisting hole in the first part to enable insertion of a pilot of the pilot bushing into the preexisting hole;

applying rotational and downward forces to a pilot drill to rotate the pilot drill in the pilot bushing and through the preexisting hole in the first part to open an aligned pilot hole in the second part;

removing the pilot bushing from the first part;

positioning an opener drill bushing over the preexisting hole in the first part and the aligned pilot hole of the second part;

inserting a pilot end of an opener drill into the preexisting hole of the first part and the aligned pilot hole of the second part; and applying rotational and downward forces to the opener drill to rotate the opener drill for movement through the preexisting hole in the first part and the aligned pilot hole in the second part to open the aligned pilot hole to the desired size.

8. A tool for preparing fastener apertures for assembling parts comprising:

a body section having a central bore, an upper end, and a lower end, the central bore passing through the body section from the upper end to the lower end;

a drive shaft projecting at least partly into the central bore of the body section and mounted for rotational and longitudinal movement within the body section;

a drill receiving socket attached to a lower end of said drive shaft and adapted to receive a drill bit;

a drill bushing secured to the lower end of the body section, the drill bushing having an internal bore to allow passage of a drill bit; and said drill bushing further includes a pilot drill bushing having an external pilot collar attached to a bottom of the pilot drill bushing, the external pilot collar concentric with an internal bore of the pilot drill bushing.

9. The drill guide in accordance with claim 5 wherein said base further includes a lower surface having a polymeric anti-slip coating.

10. The tool for preparing fastener apertures of claim 8 further comprising:

an opener drill bit for mounting in the drill receiving socket of the drive shaft, the opener drill bit comprising, a main portion having a first diameter disposed along an axis of rotation of the drill bit; and a lower portion having a second, smaller diameter and extending from the main portion along the axis of rotation, the lower portion extending from the distal end of the opener drill bit.

11. The drill guide in accordance with claim 4 further comprising a retractor spring mounted in the hollow body section and engaging the drive shaft for retracting the drive shaft toward the upper end of the body section.

12. The tool for preparing fastener apertures of claim 8 further comprising a retractor spring mounted in the body section and engaging the drive shaft for retracting a lower end of the drive shaft toward the upper end of the body section.

13. The tool for preparing fastener apertures of claim 8 further comprising a base attached to the lower end of the body section, the base extending radially from an axis of the central bore of the body section and adapted to contact the surface of a workpiece for stabilizing the body section and the drive shaft along the axis of the central bore.

14. The tool for preparing fastener apertures of claim 13 wherein a lower end of the base includes a cavity for accessing the drill bushing.

15. The tool for preparing fastener apertures of claim 13 further comprising a polymeric anti-slip coating on a lower surface of the base.

16. The tool for preparing fastener apertures of claim 13 wherein the base includes a truncated conical shape and a lower surface of the base forms a ring encircling the axis of the central bore of the body section.

17. The drill guide in accordance with claim 4 further comprising an internal bushing having an internal bore for passage of the drive shaft, the internal bushing engaging a ledge in the hollow body section and engaging a lower end of the retractor spring to provide a stop during downward longitudinal movement of the drive shaft.

18. A tool for preparing fastener apertures for assembling parts comprising:

a body section having a cylindrical bore, an upper end, and a lower end, the cylindrical bore passing through the body section from the upper end to the lower end and comprising a lower portion with a first diameter and an upper portion with a larger, second diameter, with a change in diameter between the first diameter and the second diameter creating a ledge between the upper and lower portions of the cylindrical bore;

a drive shaft projecting at least partly into the cylindrical bore of the body section and mounted for rotational and longitudinal movement within the body section; and a pilot drill bushing secured to the lower end of the body section, the pilot drill bushing having an internal bore to allow passage of a drill bit and an external pilot collar attached to a bottom of the pilot drill bushing and concentric with the internal bore of the pilot drill bushing.

19. The tool for preparing fastener apertures of claim 18 further comprising a retractor spring mounted in the cylindrical bore of the body section and engaging the drive shaft for retracting the drive shaft toward the upper end of the body section, the ledge in the cylindrical bore engaging a lower end of the retractor spring to provide a stop support for the retractor spring during downward longitudinal movement of the drive shaft.

20. The tool for preparing fastener apertures of claim 8 wherein the drill bushing includes an opener drill bushing interchangeable with the pilot drill bushing.

21. The tool for preparing fastener apertures of claim 19 further comprising an internal bushing having an internal bore for passage of the drive shaft, the internal bushing engaging the ledge in the cylindrical bore and engaging a lower end of the retractor spring to provide a stop support for the retractor spring during downward longitudinal movement of the drive shaft.

\* \* \* \* \*